United States Patent
Matsunami

(10) Patent No.: US 9,792,512 B2
(45) Date of Patent: Oct. 17, 2017

(54) DEVICE TO EXTRACT BIOMETRIC FEATURE VECTOR, METHOD TO EXTRACT BIOMETRIC FEATURE VECTOR, AND COMPUTER-READABLE, NON-TRANSITORY MEDIUM

(71) Applicant: FUJITSU LIMITED, Kawasaki-shi, Kanagawa (JP)

(72) Inventor: Tomoaki Matsunami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 529 days.

(21) Appl. No.: 14/445,207

(22) Filed: Jul. 29, 2014

(65) Prior Publication Data
US 2015/0036894 A1    Feb. 5, 2015

(30) Foreign Application Priority Data
Jul. 30, 2013 (JP) .................. 2013-158122

(51) Int. Cl.
G06K 9/00 (2006.01)
G06K 9/46 (2006.01)

(52) U.S. Cl.
CPC ..... *G06K 9/00885* (2013.01); *G06K 9/00067* (2013.01); *G06K 9/4619* (2013.01); *G06K 2009/00932* (2013.01)

(58) Field of Classification Search
CPC .......... G06K 9/00885; G06K 9/00067; G06K 9/4619; G06K 2009/00932
See application file for complete search history.

(56) References Cited

U.S. PATENT DOCUMENTS 5,787,187 A * 7/1998 Bouchard ................ A61B 5/12
                                                    235/382
5,905,807 A   5/1999 Kado et al.
(Continued)

FOREIGN PATENT DOCUMENTS

JP    05-197793    8/1993
JP    08-106533    4/1996
(Continued)

OTHER PUBLICATIONS

Kelkboom, E. et al. "Binary Biometrics: an Analytic Framework to Estimate the Bit Error Probability under Gaussian Assumption" Sep. 29-Oct. 1, 2008, IEEE International Conference on Biometrics pages.*
(Continued)

*Primary Examiner* — Chan Park
*Assistant Examiner* — Mia M Thomas
(74) *Attorney, Agent, or Firm* — Staas & Halsey LLP

(57) ABSTRACT

A device to extract a biometric feature vector includes a memory and a circuitry. The circuitry is configured to obtain a biometric image, to generate a plurality of small region images from the biometric image so that variability of biometric information amounts among the plurality of small region images is equal to or less than a predetermined value, to extract biometric local feature amounts from the small region images and to generate a biometric feature vector by combining the biometric local feature amounts in accordance with a predetermined rule, the biometric feature vector indicating a feature for identifying the biometric image.

12 Claims, 14 Drawing Sheets

(56) References Cited

U.S. PATENT DOCUMENTS

| | | | |
|---|---|---|---|
| 7,630,526 B2* | 12/2009 | Bober | G06K 9/00281 382/118 |
| 7,689,010 B2* | 3/2010 | Canzler | G06F 3/012 382/118 |
| 7,999,846 B2* | 8/2011 | Kiyohara | G06K 9/00255 348/143 |
| 8,116,571 B2* | 2/2012 | Kamei | G06K 9/00275 382/190 |
| 8,121,357 B2* | 2/2012 | Imaoka | G06K 9/00288 382/118 |
| 8,162,219 B2* | 4/2012 | Pine | G06K 9/00 235/454 |
| 8,213,691 B2* | 7/2012 | Jones | G06K 9/00288 345/621 |
| 8,966,277 B2* | 2/2015 | Rane | G06F 21/32 380/28 |
| 2003/0118215 A1* | 6/2003 | Mizoguchi | G06K 9/00013 382/115 |
| 2005/0008148 A1* | 1/2005 | Jacobson | G06F 3/038 380/26 |
| 2005/0139782 A1 | 6/2005 | Nagahashi et al. | |
| 2005/0238207 A1* | 10/2005 | Tavares | G06K 9/00885 382/115 |
| 2007/0127787 A1* | 6/2007 | Castleman | G06K 9/00248 382/118 |
| 2007/0199047 A1* | 8/2007 | Gibart | G06F 21/32 726/2 |
| 2007/0219801 A1* | 9/2007 | Sundaram | G10L 17/04 704/270 |
| 2008/0107311 A1* | 5/2008 | Huang | G06K 9/00288 382/118 |
| 2009/0165085 A1* | 6/2009 | Naka | G06F 21/32 726/2 |
| 2009/0220156 A1 | 9/2009 | Ito et al. | |
| 2010/0066493 A1* | 3/2010 | Rachlin | G06F 21/32 340/5.82 |
| 2010/0119126 A1* | 5/2010 | Rane | G06K 9/00067 382/125 |
| 2010/0150452 A1* | 6/2010 | Kamei | G06K 9/00087 382/202 |
| 2010/0166266 A1* | 7/2010 | Jones | G06K 9/00288 382/118 |
| 2010/0316262 A1* | 12/2010 | Kuwahara | G06K 9/00979 382/115 |
| 2010/0332487 A1* | 12/2010 | Monden | G06K 9/00087 707/758 |
| 2011/0188710 A1* | 8/2011 | Muquit | G06K 9/00 382/115 |
| 2011/0213614 A1* | 9/2011 | Lu | G10L 15/02 704/236 |
| 2012/0082349 A1* | 4/2012 | Kong | G06K 9/00617 382/117 |
| 2012/0195475 A1* | 8/2012 | Abiko | G06T 7/00 382/115 |
| 2012/0250949 A1* | 10/2012 | Abiko | G06K 9/0002 382/115 |
| 2012/0304267 A1* | 11/2012 | Yamada | G06K 9/00006 726/7 |
| 2013/0051664 A1* | 2/2013 | Fujita | G06T 5/002 382/165 |
| 2013/0142405 A1* | 6/2013 | Nada | G06K 9/001 382/124 |
| 2013/0212655 A1* | 8/2013 | Hoyos | G06K 9/00107 726/5 |
| 2013/0259321 A1* | 10/2013 | Aoki | G06K 9/00885 382/115 |
| 2014/0133711 A1* | 5/2014 | Abe | G06K 9/00067 382/115 |
| 2014/0270404 A1* | 9/2014 | Hanna | G06Q 30/0609 382/116 |
| 2014/0294261 A1* | 10/2014 | Abe | G06K 9/00006 382/124 |
| 2015/0030216 A1* | 1/2015 | Abe | G06K 9/00067 382/124 |
| 2016/0085958 A1* | 3/2016 | Kang | G06F 21/40 726/19 |

FOREIGN PATENT DOCUMENTS

| | | |
|---|---|---|
| JP | 2003-196659 | 7/2003 |
| JP | 2003-337949 | 11/2003 |
| JP | 2005-190400 | 7/2005 |
| JP | 2008-054059 | 3/2008 |
| JP | 2009-211178 | 9/2009 |
| JP | 2011-159035 | 8/2011 |
| WO | WO 2008/133235 A1 | 11/2008 |
| WO | WO 2009/104429 A1 | 8/2009 |

OTHER PUBLICATIONS

Korean Office Action dated Apr. 1, 2016 in corresponding Korean Patent Application No. 10-2014-0097553.
Korean Office Action dated Aug. 31, 2015 in corresponding Korean Patent Application No. 10-2014-0097553.
Extended European Search Report dated Apr. 28, 2015 in corresponding European Patent Application No. 14179108.7.
Putra, "Palmprint Feature Representation Using Fractal Characteristics", Journal of Theoretical and Applied Information Technology, vol. 53, No. 2, Jul. 2013, pp. 274-282.
Putra et al., "High Performance Palmprint Identification System Based on Two Dimensional Gabor", Telkomnika, vol. 8, No. 3, Dec. 2010, pp. 309-318.
Kumar et al., "Personal Verification Using Palmprint and Hand Geometry Biometric", AVBPA 2003, LNCS 2688, 2003, pp. 668-678.
Chinese Office Action dated Mar. 3, 2017 in Chinese Patent Application No. 201410370066.X.
European Office Action dated Mar. 27, 2017 in European Patent Application No. 14179108.7.
Japanese Office Action dated Mar. 7, 2017 in corresponding Japanese Patent Application No. 2013-158122.

* cited by examiner

EXAMPLE OF REMARKABLE POINT

SMALL REGIONS WHOSE CENTER IS A FEATURE POINT THAT IS THE CLOSEST TO A REMARKABLE POINT ARE CALCULATED.

EXAMPLE OF FEATURE POINT AND SMALL REGION

FIG. 5

|  | REMARKABLE POINT | FEATURE POINT | SMALL REGION | FEATURE AMOUNT |
|---|---|---|---|---|
| $f_1$ | (-50, 30) | (-62, 27) | (-77, 12) – (-47, 42) | 1.86 |
| $f_2$ | (-50, 60) | (-51, 60) | (-66, 45) – (-36, 75) | 0.97 |
| $f_3$ | (-50, 90) | NONE | – | 0 |
| ⋮ | ⋮ | ⋮ | ⋮ | ⋮ |
| $f_{16}$ | (50, 150) | (45, 161) | (30, 146) – (60, 176) | 1.22 |

CIRCUMFERENCE OF SMALL
REGION IS TRIMMED.

CIRCUMFERENCE OF SMALL
REGION IS OVERLAPPED.

DEVICE TO EXTRACT BIOMETRIC FEATURE VECTOR, METHOD TO EXTRACT BIOMETRIC FEATURE VECTOR, AND COMPUTER-READABLE, NON-TRANSITORY MEDIUM

CROSS-REFERENCE TO RELATED APPLICATION

This application is based upon and claims the benefit of priority of the prior Japanese Patent Application No. 2013-158122, filed on Jul. 30, 2013, the entire contents of which are incorporated herein by reference.

FIELD

A certain aspect of embodiments described herein relates to a device to extract a biometric feature vector, a method to extract a biometric feature vector, and a computer-readable, non-transitory medium.

BACKGROUND

An authentication using human biometric information such as a fingerprint, a palm print, a vein pattern, an iris, a face image or a sound is used as an identification means having high reliability. In a biometric authentication technology field, it is demanded that biometric feature information of biometric information that is useful for identification is expressed by a biometric feature binary string that is expressed by a binary string of "0" and "1". When the biometric feature information is binarized, a size of the biometric feature information is reduced, and it is possible to perform a matching with a simple distance calculation. It is possible to achieve a usage scene such as a biometric authentication with a low spec CPU such as an IC card, an ultrahigh-speed comparison of many biometric data, a cancelable biometric authentication destroying enrolled biometric data or generating a new enrolled data from the biometric data.

However, biometric information input by a user may fluctuate according to an inputting method or an environment. Therefore, a repeatability of biometric feature information extracted from identical biometric information may be degraded, and matching accuracy may be degraded.

And so, Japanese Patent Application Publication No. 5-197793 discloses that a feature point of a face image is extracted with respect to each component of the face. International Publication Pamphlet No. WO 2008/133235 discloses a method in which a biometric image is converted into a frequency component, a main component of the frequency component is used as biometric feature information, a distance calculation by performing a DP (Dynamic Programming) matching and a HMM (Hidden Markov Model) independently in a vertical direction and a horizontal direction, and a matching having a resistance against a positional shift and a distortion is achieved. International Publication Pamphlet No. WO 2009/104429 discloses a method performing a robust matching by dividing a fingerprint image into small regions including two or three ridge lines and relating small regions having a high correlation between enrolled fingerprint image and an input fingerprint image to each other in a fingerprint authentication.

SUMMARY

According to an aspect of the present invention, there is provided a device to extract a biometric feature vector including a memory; and a circuitry, wherein the circuitry is configured: to obtain a biometric image; to generate a plurality of small region images from the biometric image so that variability of biometric information amounts among the plurality of small region images is equal to or less than a predetermined value; to extract biometric local feature amounts from the small region images; and to generate a biometric feature vector by combining the biometric local feature amounts in accordance with a predetermined rule, the biometric feature vector indicating a feature for identifying the biometric image.

BRIEF DESCRIPTION OF DRAWINGS

FIG. 5 illustrates a relationship among a remarkable point, a feature point, a small region image and a feature amount;

DESCRIPTION OF EMBODIMENTS

In the technology of above-mentioned patent documents, a process for reducing a positional shift and a distortion of biometric information is performed during a matching process. Therefore, when the biometric feature information used for the matching is binarized, repeatability of a binary string may be degraded by influence of the positional shift or the distortion.

The following is a description of embodiments, with reference to the accompanying drawings.

[First Embodiment]

Figure 1A:
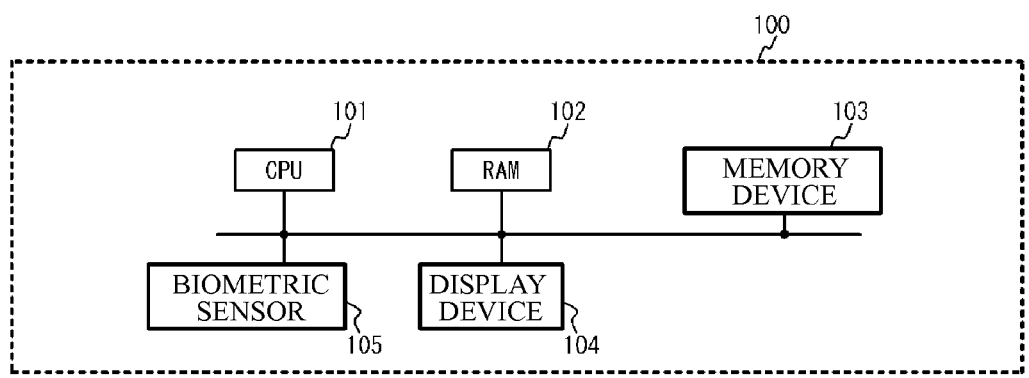
FIG. 1A illustrates a block diagram for describing a hardware structure of a device to extract a biometric feature vector in accordance with a first embodiment.
Figure 1B:
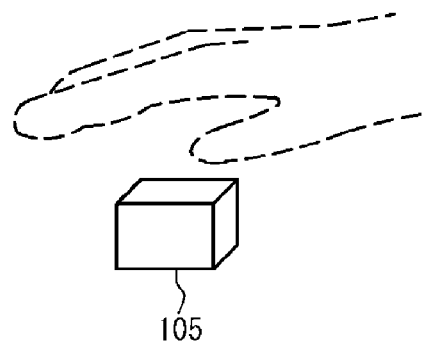
FIG. 1B illustrates a schematic view of a biometric sensor.

FIG. 1A illustrates a block diagram for describing a hardware structure of a device 100 to extract a biometric feature vector in accordance with a first embodiment. FIG. 1B illustrates a schematic view of a biometric sensor 105 described later. As illustrated in FIG. 1A, the device 100 to extract a biometric feature vector has a CPU 101, a RAM 102, a memory device 103, a display device 104, a biometric sensor 105, and so on. These components are coupled to each other with a bus or the like.

The CPU 101 is a central processing unit. The CPU 101 includes one or more core. The RAM (Random Access Memory) 102 is a volatile memory temporally storing a program executed by the CPU 101, a data processed by the CPU 101, and so on.

The memory device 103 is a nonvolatile memory device. The memory device 103 may be a SSD (Solid State Drive) such as a ROM (Read Only Memory) or a flash memory, or a hard disk driven by a hard disk drive. The memory device 103 stores a program to extract a biometric feature vector. The display device 104 is a liquid crystal display, an electro luminescence panel or the like and displays a result of a process of the device 100 to extract a biometric feature vector.

The biometric sensor 105 is a sensor to obtain a biometric image of a user. The biometric sensor 105 may be a contact type sensor that obtains a biometric image by contacting a part of a body of a user or a non-contact type sensor that obtains a biometric image without contacting. In the embodiment, the biometric sensor 105 is a sensor to obtain a vein image without contacting and is, for example, a CMOS (Complementary Metal Oxide Semiconductor) camera or the like. For example, the biometric sensor 105 obtains a palm vein image with use of a near-infrared light.

The program to extract a biometric feature vector stored in the memory device 103 is developed in the RAM 102. The CPU 101 executes the program to extract a biometric feature vector developed in the RAM 102. Thus, each process of the device 100 to extract a biometric feature vector is executed.

Figure 2:
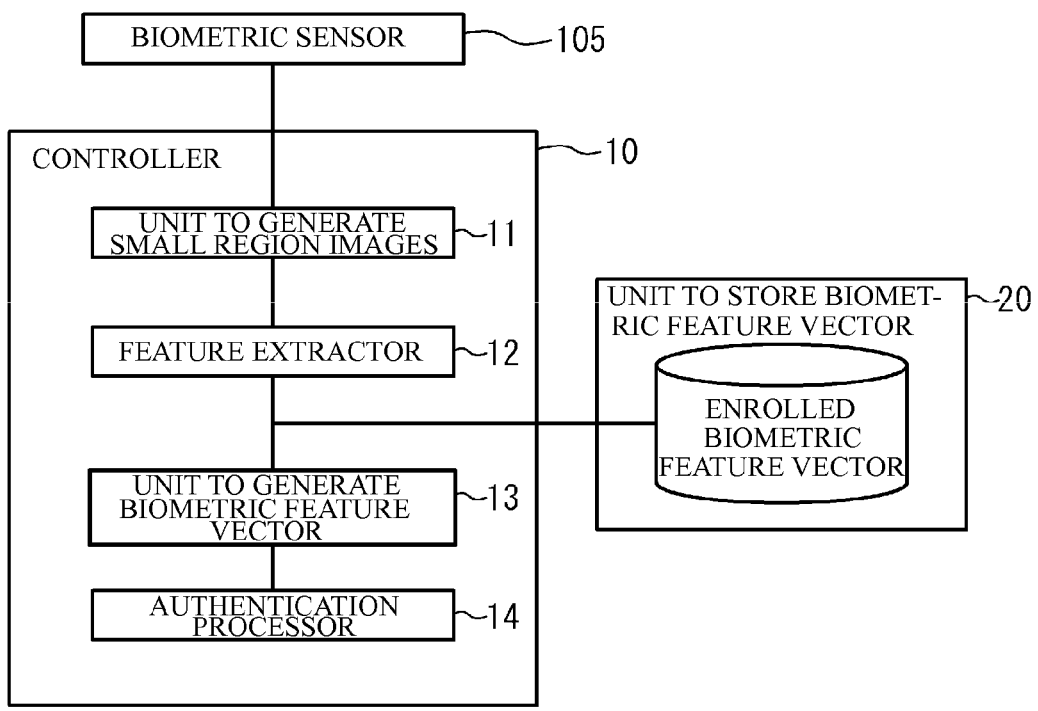
FIG. 2 illustrates a block diagram of each function realized by execution of a program to extract a biometric feature vector.

FIG. 2 illustrates a block diagram of each function realized by the execution of the program to extract a biometric feature vector. By the execution of the program to extract a biometric feature vector, a controller 10 and a unit 20 to store a biometric feature vector. The controller 10 acts as a unit 11 to generate small region images, a feature extractor 12, a unit 13 to generate a biometric feature vector, and an authentication processor 14.

The unit 11 to generate small region images generates a plurality of small region images from a vein image obtained by the biometric sensor 105. The feature extractor 12 extracts a biometric local feature amount from each small region image generated by the unit 11 to generate small region images. The unit 13 to generate a biometric feature vector generates a biometric feature vector from the biometric local feature amount extracted by the feature extractor 12. The authentication processor 14 performs a matching between a biometric feature vector generated by the unit 13 to generate a biometric feature vector and an enrolled biometric feature vector stored by the unit 20 to store a biometric feature vector. A description will be given of details of each unit.

Figure 3:
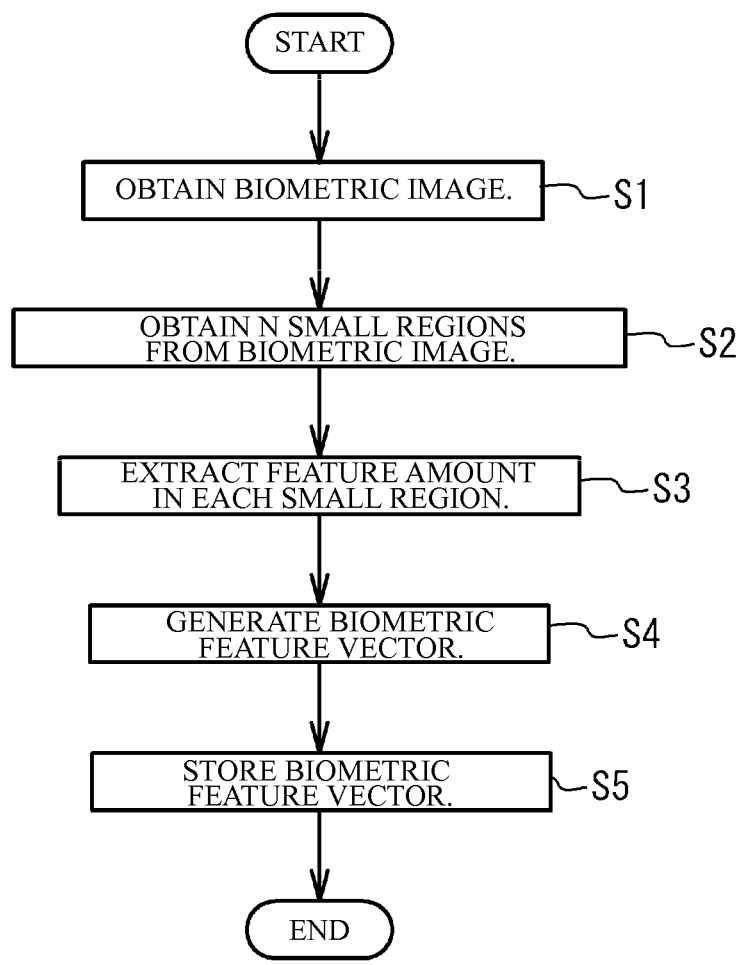
FIG. 3 illustrates a flowchart of an example of an enrollment process for generating an enrolled biometric feature vector.

FIG. 3 illustrates a flowchart of an example of an enrollment process for generating an enrolled biometric feature vector. With reference to FIG. 3, the biometric sensor 105 obtains a pam vein image of a user (Step S1). Next, the unit 11 to generate small region images generates a plurality of small region images from the vein image obtained by the biometric sensor 105 (Step S2). The unit 11 to generate small region images generates the small region images so that variability of biometric information amounts is equal to or less than a predetermined value (a threshold) among the plurality of small region images.

Figure 4:
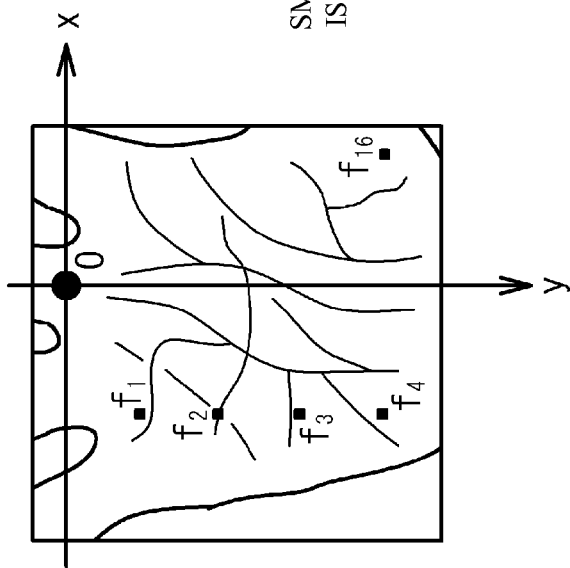
FIG. 4 illustrates generation of small region images.
Figure 4:
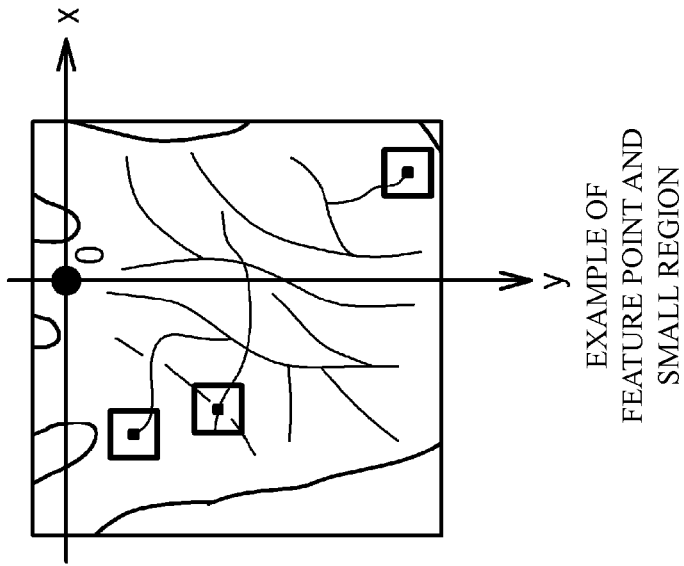

FIG. 4 illustrates the generation of the small region images. The unit 11 to generate small region images generates N small region images. The "N" may be an optional number that is two or more. A description will be given of a case where the "N" is 16. A vein image is expressed as "I". A size of the "I" is, for example, 200 pixels×200 pixels.

The unit 11 to generate small region images determines an origin "O" on the image I as a specific point (that can be used as a reference point) such as a base of a middle finger without positional shift. And, the unit 11 to generate small region images determines remarkable points of which number N is 16 as fn(x, y)=(40i, 40j−20) as an example. "i" is 1, 2, 3 and 4. "j" is −1, 0, 1 and 2. Next, the unit 11 to generate small region images searches a feature point of which distance is the smallest with respect to each of 16 remarkable points fn, and relates the feature point to the fn. The feature point is a point indicating a biometric feature such as an edge point, a branch point, a cross point of a vein pattern. However, when there is no feature point within a distance of a predetermined value L from a specific remarkable point fn, the unit 11 to generate small region images determines that there is no feature point corresponding to the fn. Finally, the unit 11 to generate small region images determines small region images from each feature point. For example, a rectangular of m pixels×n pixels of which center is the feature point, an ellipse having a major axis a and minor axis b of which center is the feature point or the like is determined as the small region images. FIG. 4 illustrates a rectangular in which m and n are 30. The small region image may have a part of pixels that are not overlapped with pixels of another small region image and may have a part of pixels that are common with pixels of another small region image. However, when there is no feature point corresponding to the fn, the unit 11 to generate small region images does not determine the small region image. Determining method of the remarkable point fn is optional. In the above-mentioned example, the remarkable points are determined at a constant interval. However, the interval may be non-constant. The interval may be smaller as the remarkable point fn approaches the center point.

The unit 11 to generate small region images generates a plurality of small region images so that variability of biometric information amounts is equal to or less than a predetermined value among the plurality of small region images. For example, the unit 11 to generate small region images determines a pixel value of a vein pattern as "1" and determines a pixel value of a region other than the vein pattern as "0". Next, when an abundance of a vein in each small region image (a ratio of the number of biometric pixel in a small region image) is defined as total of pixel values of a small region image/the number of pixel included in the small region image, the unit 11 to generate small region images may calculate the "m" and the "n" so that the abundance of the vein is a predetermined value or included in a predetermined range and may determine each small region image. A shape of the small region image is not limited specifically.

With reference to FIG. 3 again, after execution of the Step S2, the feature extractor 12 extracts a biometric local feature amount of each small region image (Step S3). As an example, the biometric local feature amount indicates a luminance gradient or a luminance changing in the small region image. For example, the biometric local feature amount is a mean gradient, a variance of luminance values or the like in the small region image. As an example, the feature extractor 12 extracts a luminance gradient of each small region image as the biometric local feature amount.

However, the biometric local feature amount may be zero with respect to fn without a feature point. In the embodiment, a single biometric local feature amount is calculated with respect to each of N fns. Totally, N×biometric local feature amount are obtained. FIG. 5 illustrates a relationship among a remarkable point, a feature point, a small region image and a feature amount.

With reference to FIG. 3 again, after execution of the Step S3, the unit 13 to generate a biometric feature vector generates a N-dimensional biometric feature vector by combining the N biometric local feature amounts (Step S4). The biometric feature vector has a structure in which N biometric local feature amounts are arranged in accordance with a predetermined rule. The unit 13 to generate a biometric feature vector uses the N arranged biometric local feature amounts as the biometric feature vector when a single feature amount is calculated with respect to each of the N×fn. The N×fn may be arranged like f1, f2, to fn or may be re-arranged in accordance with a predetermined rule.

With reference to FIG. 3 again, after execution of the Step S4, the unit 13 to generate a biometric feature vector relates the generated biometric feature vector with an ID of a user and stores the biometric feature vector in the unit 20 to store a biometric feature vector (Step S5). With the processes, an enrolled biometric feature vector of each user is stored.

Figure 6:
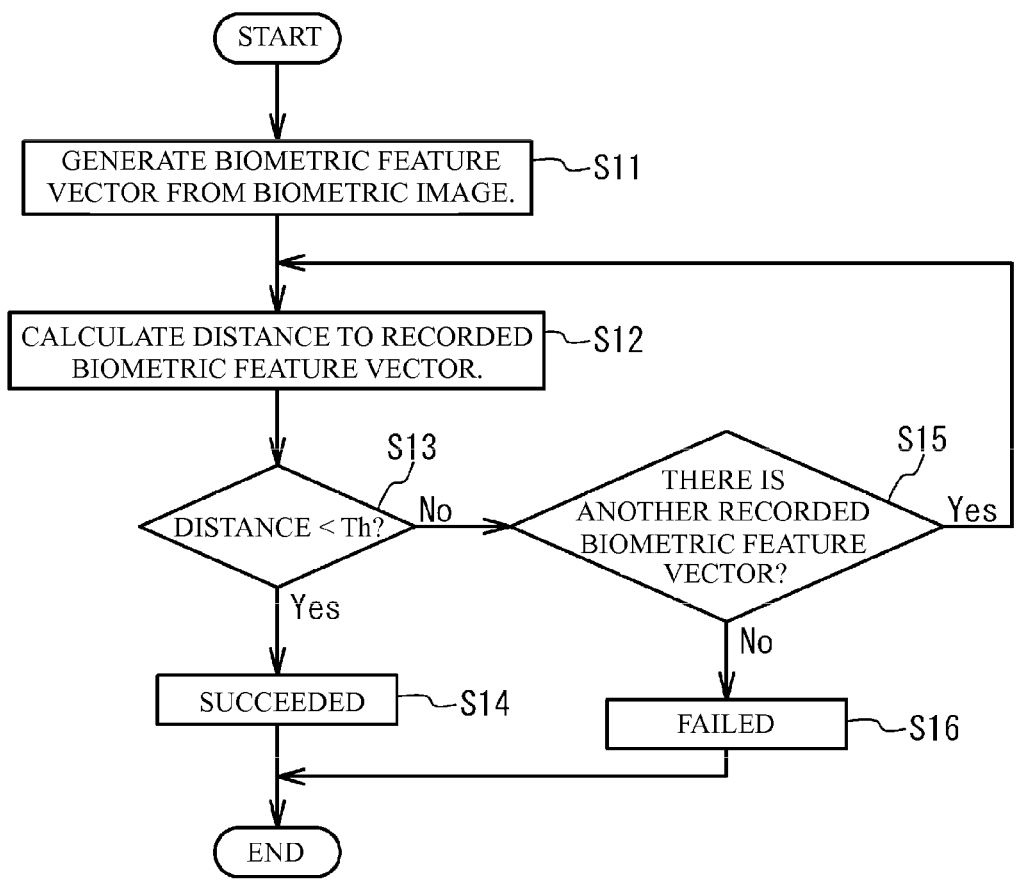
FIG. 6 illustrates a flowchart of an example of an authentication process with respect to a user of which enrolled biometric feature vector is stored.

FIG. 6 illustrates a flowchart of an example of an authentication process with respect to a user of which enrolled biometric feature vector is stored. As illustrated in FIG. 6, the device 100 to extract a biometric feature vector generates a biometric feature vector (hereinafter referred to as input biometric feature vector) by the same processes as the Step S1 to the Step S5 of FIG. 3 (Step S11). Next, the authentication processor 14 calculates a distance between the input biometric feature vector and an enrolled biometric feature vector (Step S12). The distance may be a L1 norm, a L2 norm or the like.

The authentication processor 14 determines whether the distance calculated in the Step S12 is less than a predetermined threshold Th (Step S13). When it is determined as "Yes" in the Step S13, the authentication processor 14 determines that the authentication is succeeded (Step S14). When it is determined as "No" in the Step S13, the authentication processor 14 determines whether the unit 20 to store a biometric feature vector stores another enrolled biometric feature vector (Step S15). When it is determined as "Yes" in the Step S15, the Step S12 is executed again. In this case, another enrolled biometric feature vector stored in the unit 20 to store a biometric feature vector is used. When it is determined as "No" in the Step S15, the authentication processor 14 determines that the authentication is failed (Step S16).

In accordance with the embodiment, when a plurality of small region images are generated from a biometric image such as a vein image, variability of biometric information amounts is equal to or less than a predetermined value among the small region images. Thus, influence of a positional shift or a distortion is suppressed. In spite of the positional shift and the distortion, repeatability of a biometric feature vector extracted from biometric information can be improved. A biometric authentication can be performed speedily by a simple distance calculation because a biometric feature vector is generated from a biometric local feature amount extracted from each small region image.

By generating a biometric feature vector, it is easy to binarize information used for an authentication. Binarizing is a method in which a biometric feature vector is expressed by a binary number string of "0" and "1" through a predetermined operation. The binary number string is referred to as a biometric feature binary string. It is possible to identify a user with use of a biometric feature binary string by a distance calculation such as Hamming distance. There are many methods of the binarizing in a publicly known field. The binarizing method is not limited if the binarizing method finally outputs a binary number string.

[Second Embodiment]

In the first embodiment, a feature point of which distance is the smallest with respect to each of the N remarkable points fn is searched, and a small region image is determined from each feature point. However, the structure is not limited. In a second embodiment, each small region image is generated based on a luminance gravity center of a vein image.

Figure 7:
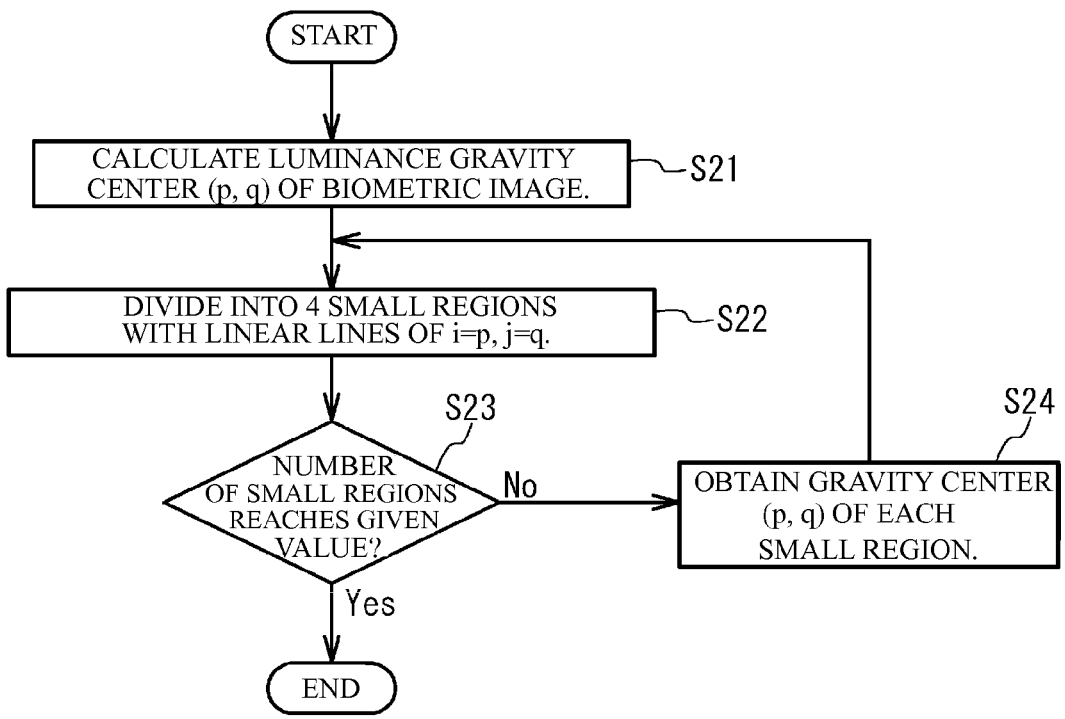
FIG. 7 illustrates a flowchart of an example of a generation process of small region images in accordance with the embodiment.

FIG. 7 illustrates a flowchart of an example of a generation process of small region images in accordance with the embodiment. With reference to FIG. 7, the unit 11 to generate small region images calculates a luminance gravity center G(p, q) of a vein image obtained by the biometric sensor 105 (Step S21). The luminance gravity center is, for example, calculated in accordance with the following formula. "i" and "j" indicate a coordinate of pixel. P(i, j) indicates a luminance value of each pixel.

$$G(p, q) = \left( \frac{\sum_{i=1}^{m} \sum_{j=1}^{n} i \cdot P(i, j)}{\sum_{i=1}^{m} \sum_{j=1}^{n} P(i, j)}, \frac{\sum_{i=1}^{m} \sum_{j=1}^{n} j \cdot P(i, j)}{\sum_{i=1}^{m} \sum_{j=1}^{n} P(i, j)} \right)$$ [Formula 1]

Figure 8:
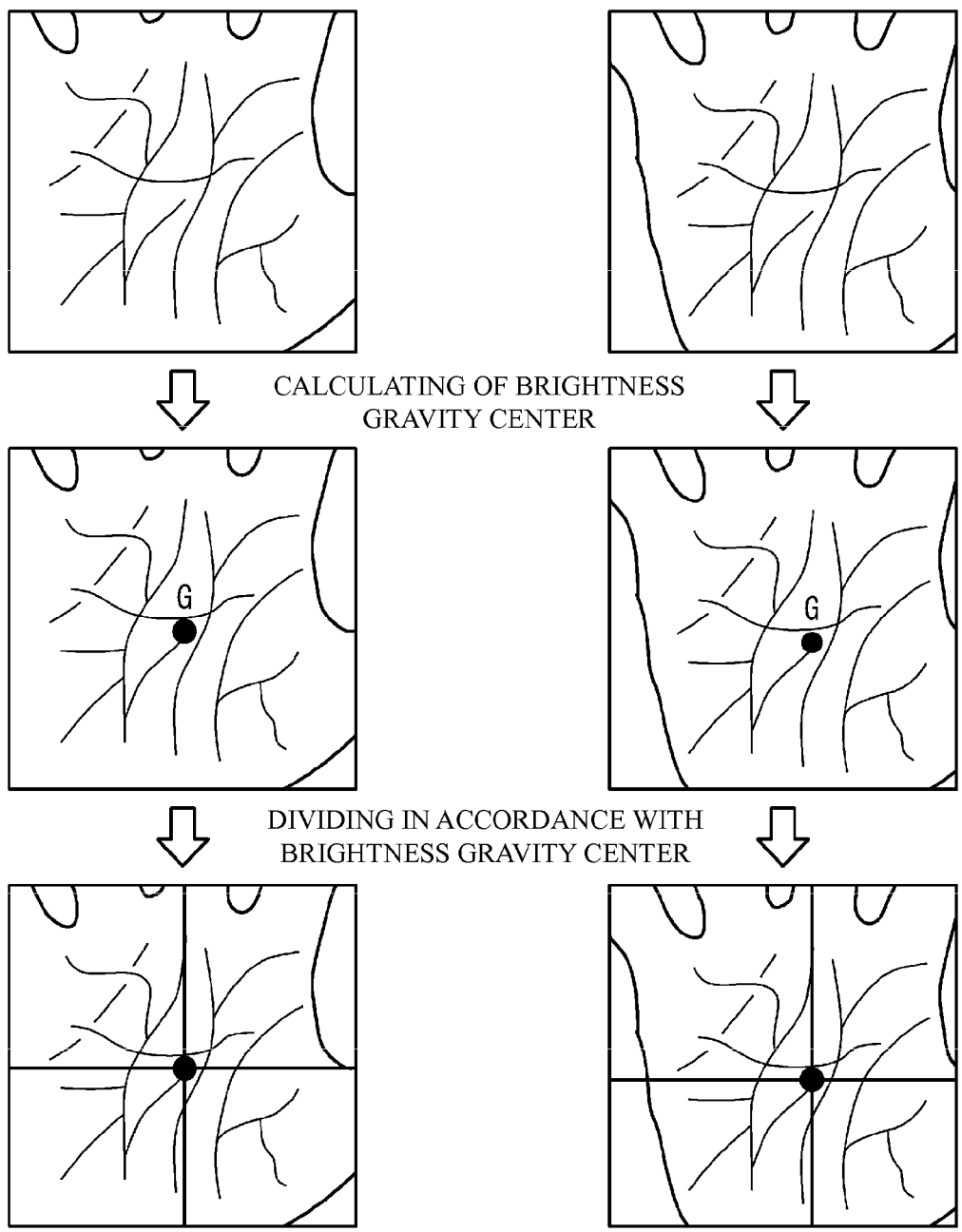
FIG. 8 illustrates an example of obtaining small region images.

Next, the unit 11 to generate small region images draws two lines passing through the luminance gravity center G(p, q) calculated with respect to a biometric image (for example, i=p, j=q) and generates four small region images obtained by dividing with use of the lines (Step S22). When the luminance gravity center is used, variability of biometric information amounts is equal to or less than a predetermined value among small region images. Even if a positional shift occurs as in the case of two type images of FIG. 8, an identical feature point (edge point, branch point, cross point) is included in corresponding two small region images.

Figure 9:
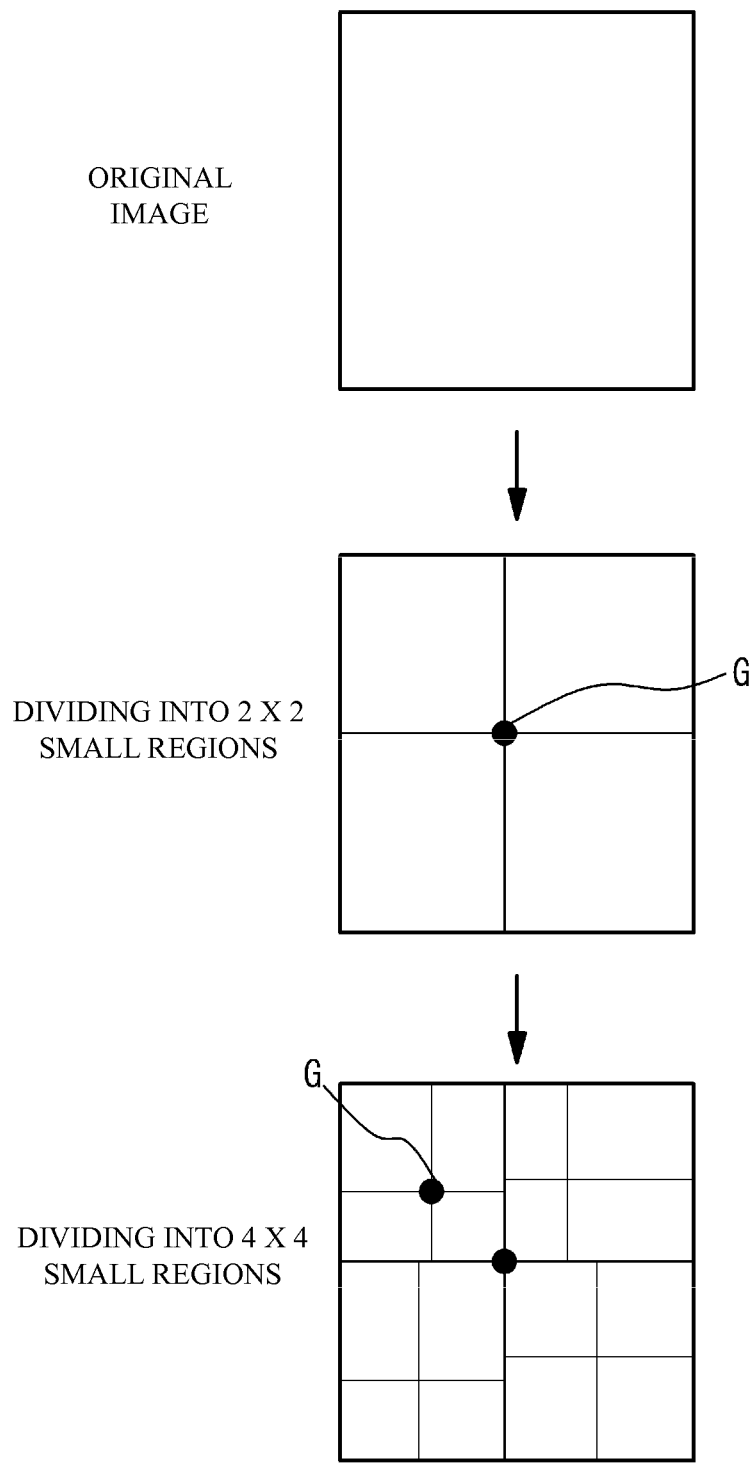
FIG. 9 illustrates an example of obtaining small region images.

The unit 11 to generate small region images may divide each small region image into a plurality of small region images. In concrete, with reference to FIG. 9, 16 (=4×4) small region images may be generated by performing the same operation with respect to the four small region images. The unit 11 to generate small region images determines whether the number of small region images reaches a predetermined value by repeating the operation after execution of the Step S22 (Step S23). When it is determined as "No" in the Step S23, the unit 11 to generate small region images calculates a gravity center (p, q) with respect to each small region image. After that, the Step S22 is executed.

Figure 10A:
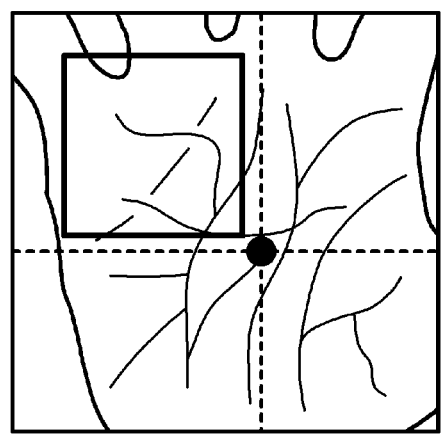
FIG. 10A and FIG. 10B illustrate an example of trimming and overlapping circumference of a small region image.
Figure 10B:
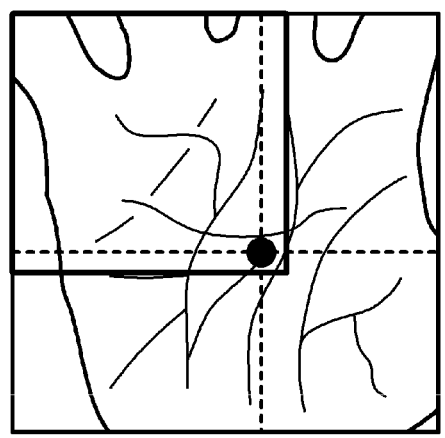

When the luminance gravity center is not used but a point internally dividing the luminance into 1/n is used, small region images of which number is optional can be generated. In the above-mentioned example, the small region image is generated by dividing a biometric image. However, as illustrated in FIG. 10A, a trimming may be performed with respect to k pixels around a small region. As illustrated in FIG. 10B, the k pixels may be overlapped. The unit 11 to generate small region images may divide each small region images into a plurality of small region images so that variability of biometric information amounts is equal to or less than a predetermined value among small region images.

In accordance with the embodiment, a positional shift of a whole image and a local distortion are reduced, and a specific feature point is included in an identical small region. That is, when a gravity center of the whole image is calculated, a global positional shift is reduced. And, a small positional shift and a small distortion are reduced, when a process is recursively performed with respect to each small region image.

[Another example of extraction of biometric local feature amount] A feature amount may be extracted through a filtering by a plurality of filters with respect to each of a plurality of small region images. For example, the feature extractor 12 may extract a biometric local feature amount using a Gabor filter coefficient that is a feature indicating a direction component of a vein pattern in each small region image.

The Gabor filter is expressed as the following formula. "x" is xcosθ+ysinθ. "y" is −xcosθ+ysinθ. "σ" is a square root of (λlog 2/2π). "θ" is a direction of a filter. "λ" is a frequency of a harmonic function. "φ" is a phase offset of a harmonic function. "σ" is a standard deviation of a Gauss function. "γ" is a parameter indicating a direction of two-dimensional Gaussian.

$$G(x, y, \lambda, \theta, \varphi, \sigma, \gamma) = \exp\left(-\frac{x'^2 + \gamma^2 y'^2}{2\sigma^2}\right)\cos\left(2\pi\frac{x'}{\lambda} + \varphi\right) \quad \text{[Formula 2]}$$

The Gabor filter is a type of a linear filter. In the above formula, a Gauss function is multiplied by a harmonic function. The Gabor filter acts as a band-pass filter that amplifies a specific frequency band and cuts off other band. The specific frequency band is determined by each parameter of the above formula. A plurality of filters may be made by changing the "λ" indicating a wavelength and the "θ" indicating a phase. In a linear vein pattern, the wavelength indicates a width of a vein, and the phase indicates a direction of a vein. Therefore, when the Gabor filter is applied to a vein image, a Gabor coefficient is amplified in a vein region having a specific width and direction. When the coefficient is amplified, a standard deviation (average or variance may be used) of the coefficient around the vein region is enlarged. That is, the standard deviation can be used as a feature amount indicating a local width and direction of a vein pattern.

For example, when there is a horizontal (θ=zero degree) vein pattern in a small region image and a Gabor filter is applied to the small region image, a Gabor coefficient is amplified and a standard deviation of the Gabor coefficient in the small region image is enlarged. On the other hand, when a Gabor filter (θ=90 degrees) is applied, the Gabor coefficient is not amplified and the standard deviation of the coefficient gets smaller.

Figure 11:
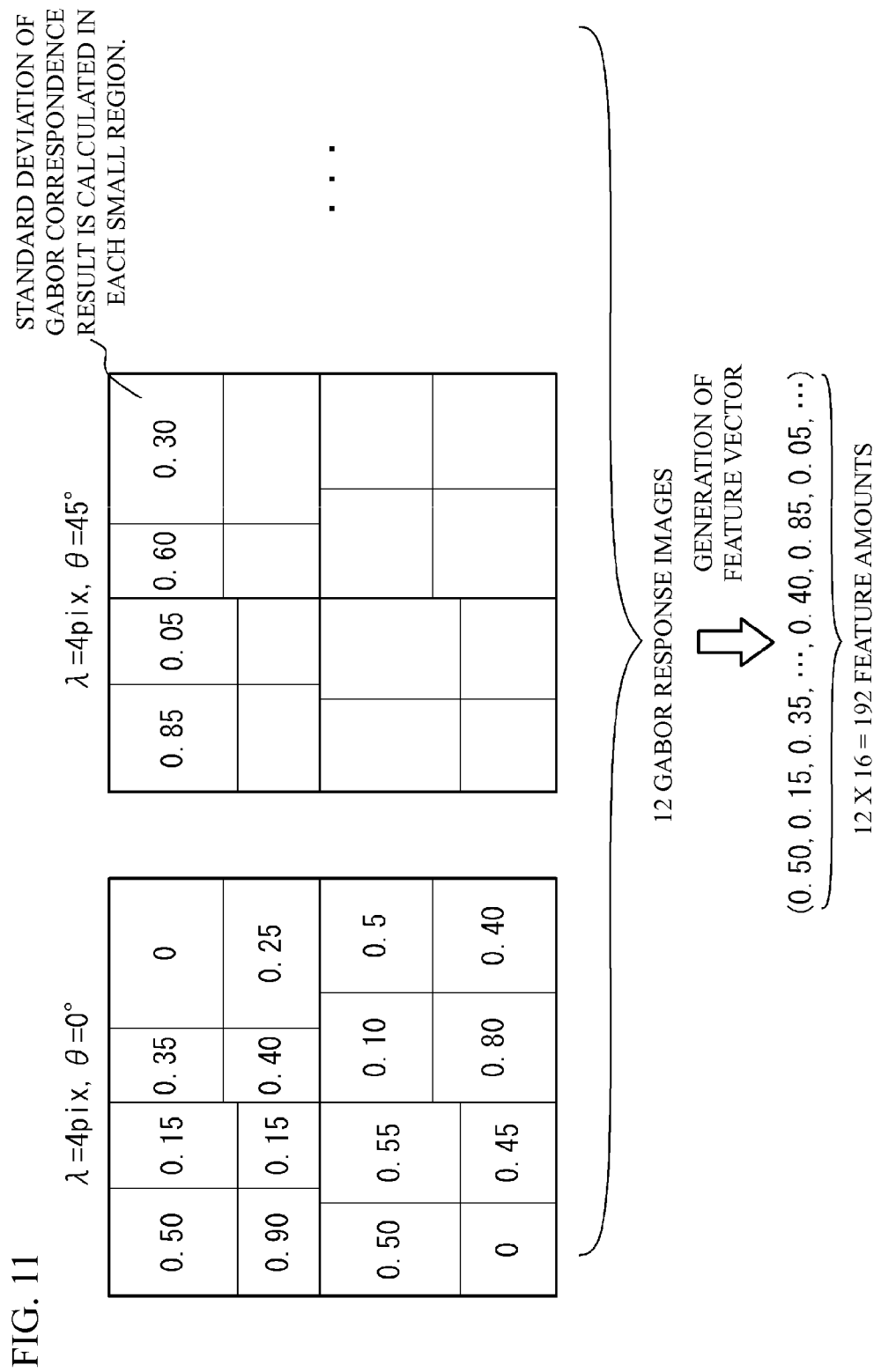
FIG. 11 illustrates a calculation method of a biometric feature vector.

Next, a description will be given of a calculation method of a biometric feature vector in this case with reference to FIG. 11. First, N small region images are generated from a vein image by one of the above-mentioned methods. In the following, N is 16. Next, a plurality of filters having a different wavelength λ and a different phase θ of a Gabor filter are applied to the vein image. In this case, the image to which the filter is applied is referred to as a Gabor response image. For example, m sheets of Gabor response images (for example, m is 12) are obtained, when the λ is 4 pixels, 8 pixels, and 16 pixels, the "θ" is 0 degree, 45 degrees, 90 degrees and 135 degrees and the filter is applied to the all combinations. Next, a standard deviation (average or variance may be used) of pixel values included in above-mentioned small region image is calculated with respect to each Gabor response image, and the standard deviations are used as biometric local feature amounts. The number of the biometric local feature amounts is 192 (=12×16 ). The 192 biometric local feature amounts are arranged in accordance with a predetermined rule and are used as a biometric feature vector. For example, 16 biometric local feature amounts in a Gabor response image of "λ"=4 pixels and "θ"=zero degree are arranged from upper left side to lower right side, and 16 biometric local feature amounts in a Gabor response image of "λ"=4 pixel and "θ"=45 degrees are arranged. This process is repeated with respect to the 12 Gabor response images. Alternately, after that, the order may be re-arranged in accordance with a predetermined rule. A Gabor coefficient may be used during determining small regions. In concrete, the small region images are determined so that a total of the Gabor coefficients of the m sheets of the Gabor response images are equal to each other among the N small regions. After that, a standard deviation of Gabor response image in each small region of the m sheets of the Gabor response images is calculated. The standard deviations are arranged in accordance with a predetermined rule and are used as a biometric feature vector.

Figure 12:
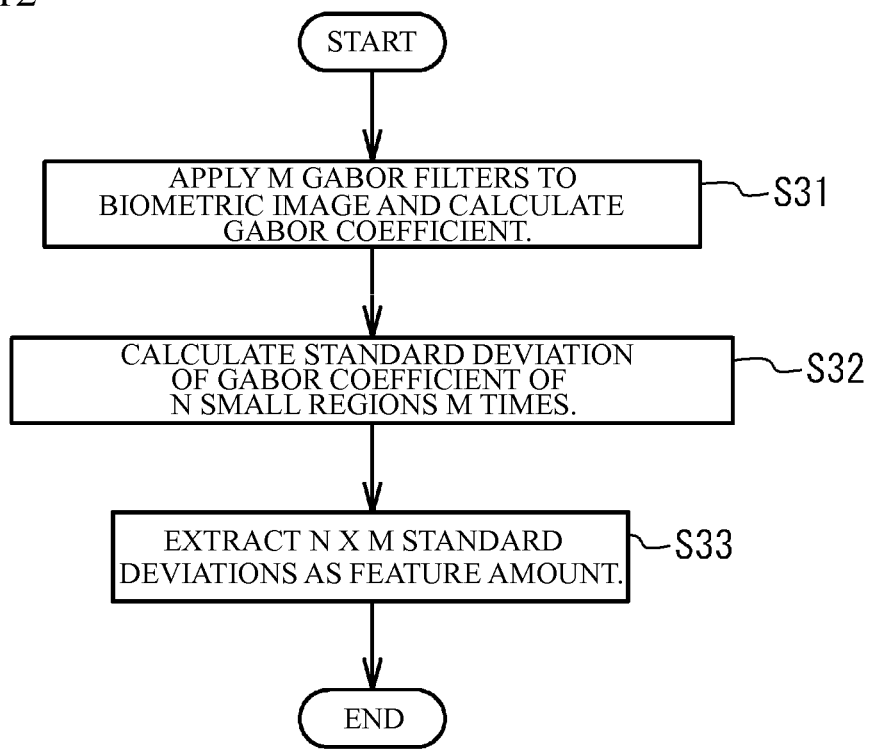
FIG. 12 illustrates a flowchart of an example of extracting feature vectors with use of Gabor Filters.

FIG. 12 illustrates a flowchart of the above-mentioned processes. The feature extractor 12 applies M Gabor filters to N small region images and calculates Gabor coefficients (Step S31). Next, the feature extractor 12 performs M calculations of standard deviations of the Gabor coefficients in the N small region images (Step S3). Next, the feature extractor 12 extracts N×M standard deviations as biometric local feature amounts (Step S33)

In a case where an arranging rule of an enrolled biometric feature vector is consistent with that of an input biometric vector, when a distance between the vectors (for example, sum of squares of each component) is calculated, the distance in an authentication in which a user is an identical person is small and the distance of an authentication in which a user is an impostor is large. Therefore, an authentication determination can be achieved with a threshold processing. On the other hand, when the arranging rule of the enrolled biometric feature vector is not consistent with that of the input biometric vector, the distance between the biometric feature vectors gets larger even if a user is an identical person. That is, when the arranging rule in a biometric feature vector is changed, re-enrollment can be allowed. And, a cancelable biometric authentication can be achieved.

A description will be given of a concrete example of the binarizing. A biometric feature vector is a 192-dimensional vector as above. First, if necessary, a process for reducing dimension is performed with respect to the biometric feature vector. The process for reducing dimension is performed with use of a principal component analysis in order to reduce a size of the biometric feature vector. Another method other than the principal component analysis can be used as the process for reducing dimension. Here, the dimension of the 192-dimensional biometric feature vector is reduced to 128 dimensions. Next, a process for generating a biometric feature binary string is performed with respect to the biometric feature vector of which dimension is reduced. As a method, for example, when an average value of each component of the biometric feature vector of which the dimension is reduced is "S", a component equal to or more than the "S" is "1", and a component less than the "S" is "0". With the processes, a process for generating biometric feature binary string of 128-dimensions can be achieved. The process for reducing the dimension is not always performed. A biometric feature vector may be binarized and a biometric feature binary string may be generated without the process for reducing dimension. And, in this case, a single binary value is generated from a single component of a biometric feature vector and thereby a biometric feature binary string is generated. However, a biometric feature binary string may be generated by generating a single binary value from a plurality of components of a biometric feature vector or generating a plurality of binary values from a single component of a biometric feature vector.

Figure 13:
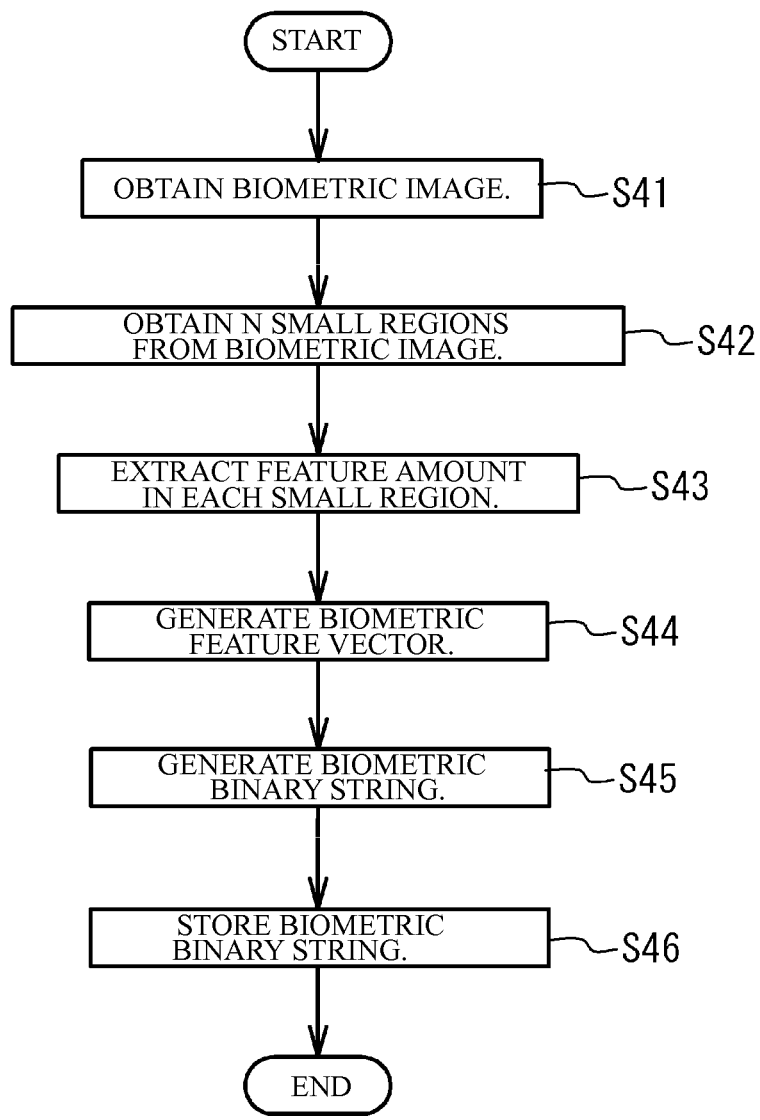
FIG. 13 illustrates a flowchart of an example of an enrollment process for generating a biometric feature binary string.

FIG. 13 illustrates a flowchart of an example of a recording process for generating a biometric feature binary string. As illustrated in FIG. 13, the biometric sensor 105 obtains a palm vein image of a user (Step S41). Next, the unit 11 to generate small region images generates N small region images from the vein image obtained by the biometric sensor 105 (Step S42). The unit 11 to generate small region images generates the small region images so that variability of biometric information amounts is equal to or less than a predetermined value (a threshold) among the plurality of small region images.

Next, the feature extractor 12 extracts a biometric local feature amount of each small region image (Step S43). Next, the unit 13 to generate a biometric feature vector generates a N-dimensional biometric feature vector by combining N biometric local feature amounts (Step S44). Next, the unit 13 to generate a biometric feature vector generates a biometric feature binary string from the biometric feature vector (Step S45). Next, the unit 13 to generate a biometric feature vector relates the generated biometric feature binary string to an ID of a user and stores the string in the unit 20 to store a biometric feature vector (Step S46). With the processes, an enrolled biometric feature binary string of each user is stored.

Figure 14:
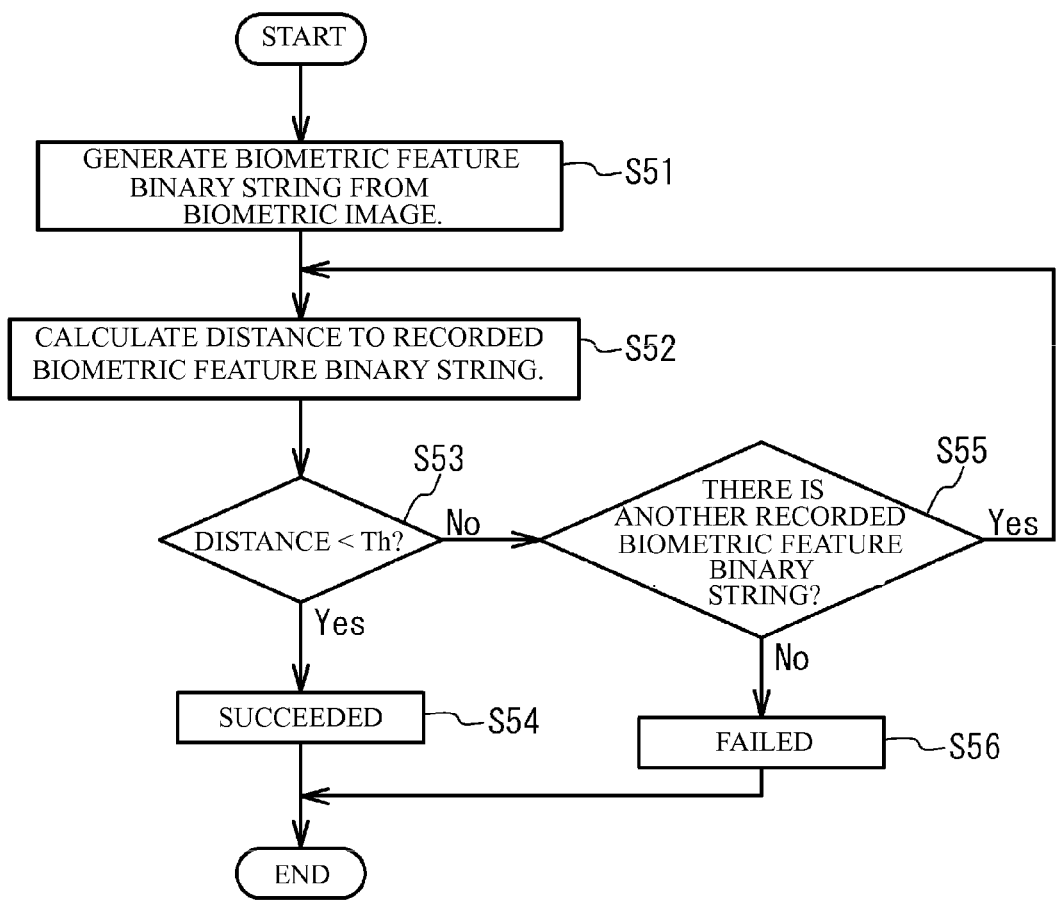
FIG. 14 illustrates a flowchart of an example of an authentication process with respect to a user of which enrolled biometric feature binary string is stored.

FIG. 14 illustrates a flowchart of an example of the authentication process with respect to a user of which enrolled biometric feature binary string is stored. As illustrated in FIG. 14, the device 100 to extract a biometric feature vector generates a biometric feature binary string with the same processes as the Step S41 to the Step S45 of FIG. 13 (Step S51). Next, the authentication processor 14 calculates a distance between an input biometric feature binary string and a predetermined enrolled biometric feature binary string (Step S52).

The authentication processor 14 determines whether the distance calculated in the Step S52 is less than a predetermined threshold Th (Step S53). When it is determined as "Yes" in the Step S53, the authentication processor 14 determines that the authentication is succeeded (Step S54). When it is determined as "No" in the Step S53, the authentication processor 14 determines whether the unit 20 to store a biometric feature vector stores another enrolled biometric feature binary string (Step S55). When it is determined as "Yes" in the Step S55, the Step S52 is executed again. In this case, another enrolled biometric feature binary string stored in the unit 20 to store a biometric feature vector is used. When it is determined as "No" in the Step S55, the authentication processor 14 determines that the authentication is failed (Step S56).

In the above-mentioned embodiments, a palm vein image is used as a biometric image. However, the biometric image is not limited. Another biometric information such as a fingerprint, a palm print, an iris, a vascular pattern other than a palm vein or the like can be used as biometric information other than the palm vein.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A device to extract a biometric feature vector comprising:
a memory device configured to store an enrolled biometric feature vector in advance; and
a circuitry,
wherein the circuitry is configured:
to obtain a biometric image;
to generate a plurality of small region images from the biometric image so that variability of biometric information amounts among the plurality of small region images is equal to or less than a predetermined value;
to extract biometric local feature amounts from the small region images;
to generate a biometric feature vector by combining the biometric local feature amounts in accordance with a predetermined rule, the biometric feature vector indicating a feature for identifying the biometric image, the biometric local feature amounts being arranged in a predetermined order in the biometric feature vector; and
to perform comparing of the biometric feature vector with the enrolled biometric feature vector by a distance calculation and determine whether a user is genuine.

2. The device as claimed in claim 1 wherein the circuitry is configured to generate the plurality of small region images so that variability of a ratio of a number of biometric pixel in the plurality of small region images is equal to or less than a predetermined value.

3. The device as claimed in claim 1 wherein the circuitry is configured to generate the plurality of small region images by dividing the biometric image with use of a luminance gravity center of the biometric image.

4. The device as claimed in claim 3 wherein the circuitry is configured to generate the plurality of small region images by dividing the biometric image along linear lines crossing at the luminance gravity center.

5. The device as claimed in claim 1 wherein the circuitry is configured to extract a biometric local feature of the small region image after performing a filtering with a plurality of filters with respect to each of the plurality of small region images.

6. The device as claimed in claim 5 wherein the circuitry is configured to apply a Gabor filter as the filter.

7. The device as claimed in claim 1 wherein the circuitry is configured to divide the biometric image into a plurality of rectangular regions.

8. The device as claimed in claim 1 wherein the circuitry is configured to obtain a palm vein image as the biometric image.

9. The device as claimed in claim 1 wherein the circuitry is configured to reduce a number of components of the biometric feature vector to a predetermined value.

10. The device as claimed in claim 1 wherein the circuitry is configured to generate the biometric feature vector having a biometric feature binary string expressed by a binary string of "0" and "1".

11. A method to extract a biometric feature vector, the method comprising:
  storing an enrolled biometric feature vector in advance;
  obtaining a biometric image;
  generating a plurality of small region images from the biometric image so that variability of biometric information amounts among the plurality of small region images is equal to or less than a predetermined value;
  extracting biometric local feature amounts from the small region images;
  generating a biometric feature vector by combining the biometric local feature amounts in accordance with a predetermined rule, the biometric feature vector indicating a feature for identifying the biometric image, the biometric local feature amounts being arranged in a predetermined order in the biometric feature vector; and
  comparing the biometric feature vector with the enrolled biometric feature vector by a distance calculation and determine whether a user is genuine.

12. A computer readable, non-transitory medium storing a program that causes a computer to execute a process, the process comprising:
  storing an enrolled biometric feature vector in advance;
  obtaining a biometric image;
  generating a plurality of small region images from the biometric image so that variability of biometric information amounts among the plurality of small region images is equal to or less than a predetermined value;
  extracting biometric local feature amounts from the small region images;
  generating a biometric feature vector by combining the biometric local feature amounts in accordance with a predetermined rule, the biometric feature vector indicating a feature for identifying the biometric image, the biometric local feature amounts being arranged in a predetermined order in the biometric feature vector; and
  comparing the biometric feature vector with the enrolled biometric feature vector by a distance calculation and determine whether a user is genuine.

* * * * *